United States Patent [19]
Yamamoto et al.

[11] Patent Number: 5,699,147
[45] Date of Patent: *Dec. 16, 1997

[54] PAPER MAGAZINE

[75] Inventors: Takashi Yamamoto; Takao Fukuda, both of Kanagawa, Japan

[73] Assignee: Fuji Photo Film Co., Ltd., Kanagawa, Japan

[*] Notice: The term of this patent shall not extend beyond the expiration date of Pat. No. 5,565,959.

[21] Appl. No.: 629,846

[22] Filed: Apr. 9, 1996

Related U.S. Application Data

[63] Continuation of Ser. No. 315,627, Sep. 30, 1994, Pat. No. 5,565,959.

[30] Foreign Application Priority Data

Oct. 15, 1993 [JP] Japan .................... 5-258451

[51] Int. Cl.⁶ ........................... B65H 23/02
[52] U.S. Cl. ............... 355/72; 355/74; 355/75; 355/76; 226/18; 226/189; 271/138; 271/219
[58] Field of Search .............. 226/18, 199, 189, 226/196; 242/55, 55.2, 71, 71.1, 76; 271/138, 143, 144, 219, 226; 355/72, 74, 75, 76, 309, 311, 317, 321

[56] References Cited

U.S. PATENT DOCUMENTS

| | | | |
|---|---|---|---|
| 3,627,304 | 12/1971 | Reeder et al. | 270/611 |
| 4,922,361 | 5/1990 | Bordignon | 226/196 |
| 4,961,613 | 10/1990 | Biggar | 242/55.53 |
| 5,145,163 | 9/1992 | Cowan et al. | 271/161 |
| 5,221,061 | 6/1993 | Nishioka et al. | 242/199 |
| 5,360,152 | 11/1994 | Matoushek | 226/199 |
| 5,365,315 | 11/1994 | Baker et al. | 355/210 |
| 5,418,604 | 5/1995 | Nagakawa et al. | 335/208 |

*Primary Examiner*—Safet Metjahic
*Assistant Examiner*—Daniel P. Malley
*Attorney, Agent, or Firm*—Sughrue, Mion, Zinn, Macpeak & Seas, PLLC

[57] ABSTRACT

A paper magazine including a magazine main body in which a photosensitive material is accommodated; a guide member for guiding the photosensitive material to a magazine opening through which the photosensitive material is delivered out to an exterior; at least one guide roller which is attached to the guide member so as to be freely rotatable, and which contacts a transverse direction end portion of the photosensitive material and guides the photosensitive material when the photosensitive material is delivered out to the exterior; and a cover which is supported at the magazine main body so as to be able to open and close an open portion of the magazine main body, and when the cover is closed, the cover is positioned so as to oppose the guide member with the photosensitive material being disposed between the guide member and the cover. As a result, load caused by friction or the like between the photosensitive material and the guide member when the photosensitive material is being conveyed does not become large. There is no need for a large conveying force to convey the photosensitive material, and the photosensitive material is not damaged.

8 Claims, 6 Drawing Sheets

PAPER MAGAZINE

This is a continuation of application No. 08/315,627, filed Sep. 30, 1994, Pat. No. 5,565,959.

BACKGROUND OF THE INVENTION

1. Field of the Invention

The present invention relates to a paper magazine which delivers a photosensitive material from an opening to a processing device while guiding the photosensitive material. The present invention is applicable to paper magazines which can be loaded into a photographic processing device such as a printer processor or the like in which a processor section is formed integrally with a printer for photographs or a printer section.

2. Description of the Related Art

Photographic printing paper, which is a photosensitive material, is wound in a roll shape in advance and accommodated within a paper magazine. The paper magazine is loaded in a printing device (printer section) for printing images from a negative film onto photographic printing paper. The photographic printing paper is pulled out from the interior of the paper magazine and is conveyed to a printing position at which images are printed. Thereafter, the photographic printing paper is sent to a developing device (processor section) which follows the printing device, and developing processing is effected.

In conventional printing devices, after being developed, the photographic printing paper is cut per image. In such a system, when the paper magazine is to be replaced, a drawback arises in that there is a large amount of photographic printing paper to be rewound into the paper magazine. As a result, a structure has been proposed in which the photographic printing paper is conveyed to the printing position after having been cut in advance to the size of the image to be printed.

However, in such a printing device, because the photographic printing paper is first cut and then conveyed, although it is necessary to correctly position the photographic printing paper in a vicinity of the printing position, it is difficult to correct the inclination of the photographic printing paper within the printing device, the deviation of the photographic printing paper from the conveying path and the like.

Accordingly, for paper magazines which are used in such a printing device, it is necessary to regulate the position of the photographic printing paper within the paper magazine and to effect advance correction of the inclination of the photographic printing paper by providing guides within the paper magazine.

Such guides disposed within the paper magazine must improve the accuracy of regulating the position of the photographic printing paper within the paper magazine. Therefore, the guide usually has a groove which is formed so as to be long in the conveying direction of the photographic printing paper and which guides the photographic printing paper. An end portion of the photographic printing paper is placed into the groove so that the photographic printing paper is guided.

However, in accordance with the above-described structure, load due to friction or the like between the photographic printing paper and the guide during conveying becomes large, and a large conveying force is needed to convey the photographic printing paper. As a result, the photographic printing paper may be damaged.

Further, when the groove guiding the photographic printing paper is long, drawbacks arise in that work is required to insert the end portion of the photographic printing paper into the groove, and loading of the photographic printing paper is difficult.

SUMMARY OF THE INVENTION

In view of the aforementioned, an object of the present invention is to provide a paper magazine in which the loadability of the photographic printing paper is improved, load applied to the photographic printing paper during the conveying thereof is reduced, and the position of the photographic printing paper within the paper magazine can be regulated reliably.

In accordance with a first aspect of the present invention, there is provided a paper magazine including a magazine main body in which an elongated photosensitive material is accommodated from an open portion of the magazine main body; a guide member attached to the magazine main body and guiding the photosensitive material to a magazine opening through which the photosensitive material is delivered out to an exterior of the paper magazine; at least one guide roller attached to the guide member so as to be freely rotatable, the guide roller contacting a transverse direction end portion of the photosensitive material and guiding the photosensitive material when the photosensitive material is delivered out to the exterior of the paper magazine; and a cover supported at the magazine main body so as to be able to open and close the open portion of the magazine main body, and when the cover is closed, the cover is positioned so as to oppose the guide member with the photosensitive material being disposed between the guide member and the cover.

The following operations are carried out at the above-described paper magazine.

An elongated photosensitive material is loaded into a paper magazine from an open portion of the magazine main body. A guide member attached to the magazine main body guides the photosensitive material to a magazine opening. At this time, the at least one guide roller, which is attached to the guide member so as to be freely rotatable, contacts the transverse direction end portion of the photosensitive material and guides the photosensitive material so that the photosensitive material does not deviate in the transverse direction.

Further, the cover is supported so as to be able to open and close the open portion of the magazine main body. When the open portion is closed, the cover is positioned so as to oppose the guide member with the photosensitive material being disposed between the guide member and the cover.

Accordingly, when the photosensitive material is delivered out to the exterior of the paper magazine, not only is the photosensitive surface (or the reverse surface) of the photosensitive material guided by the guide member and the reverse surface (or the photosensitive surface) guided by the cover, but also, the transverse direction end portion of the photosensitive material is guided by the guide roller. As a result, the position of the photosensitive material within the paper magazine is reliably regulated.

Because the transverse direction end portion of the photosensitive material is guided by the freely rotatable guide roller at this time, the load applied to the photosensitive material during the conveying thereof is reduced. Further, when the open portion is closed by the cover, the cover is positioned so as to oppose the guide member. Therefore, when the photosensitive material is loaded into the paper magazine from the open portion of the magazine main body, the cover does not hinder the loading operation, and the loadability of the photosensitive material improves. Further, when the open portion is closed, the photosensitive material is interposed between the cover and the guide member, and the photosensitive material can be prevented from separating from the guide rollers.

In a specific example of the present embodiment, it is preferable that freely rotatable rollers are disposed at the guide member and the cover, and that protrusions which extend in the transverse direction of the photosensitive material are formed at the guide member. In accordance with such a paper magazine, friction between the photosensitive material and the guide member can be reduced even more, and the load applied to the photosensitive material during the conveying thereof is reduced.

In accordance with another aspect of the present invention, there is provided a paper magazine including a magazine main body in which an elongated photosensitive material is accommodated from an open portion of the magazine main body; a guide member attached to the magazine main body so as to be rotatable, and guiding the photosensitive material to a magazine opening through which the photosensitive material is delivered out to an exterior of the paper magazine; at least one guide roller attached so as to be freely rotatable to a surface which is formed to be a step lower than a flat surface formed by the guide member, the guide roller contacting a transverse direction end portion of the photosensitive material and guiding the photosensitive material when the photosensitive material is delivered out to the exterior of the paper magazine; a cover supported at the magazine main body so as to be able to open and close the open portion of the magazine main body, and when the cover is closed, the cover is positioned so as to oppose the guide member with the photosensitive material being disposed between the guide member and the cover; and a positioning member attached to the cover so as to be elastically deformable, the positioning member contacting the guide member and positioning the guide member when the cover is closed.

The following operations are carried out at the above-described paper magazine.

Although the operations of the present aspect are the same as those of the previously-described aspect, in the present aspect, the at least one guide roller is attached so as to be freely rotatable to a surface which is formed to be a step lower than the flat surface formed by the guide member which is rotatably attached to the magazine main body. Further, the positioning member, which is attached to the cover so as to be elastically deformable, contacts the guide member and positions the guide member when the cover is closed.

Accordingly, in addition to the operations of the first aspect of the present invention, in the present aspect, the transverse direction end portion of the photosensitive material guided by the guide roller does not contact the corner portion of the guide roller, and consequently is not damaged by contacting the corner portion. Further, the guide member is reliably fixed by the positioning member.

In a specific example of the present invention, it is preferable that the surface, which is formed a step lower than the flat surface formed by the guide member, is formed so as to be long in the transverse direction of the photosensitive material, and that this surface has a plurality of screw holes aligned along the transverse direction of the photosensitive material. In accordance with such a structure, the paper magazine can be made to correspond to photosensitive materials of different widths, and the load applied to the photosensitive material can be reduced. Further, damage to the transverse direction end portions of the photosensitive material can be prevented.

DETAILED DESCRIPTION OF THE PREFERRED EMBODIMENT

Hereinafter, a detailed description of an embodiment of a paper magazine relating to the present invention will be described with reference to FIGS. 1 through 7 in which the paper magazine and a photographic printing device, in which the paper magazine is loaded, are illustrated.

Figure 1:
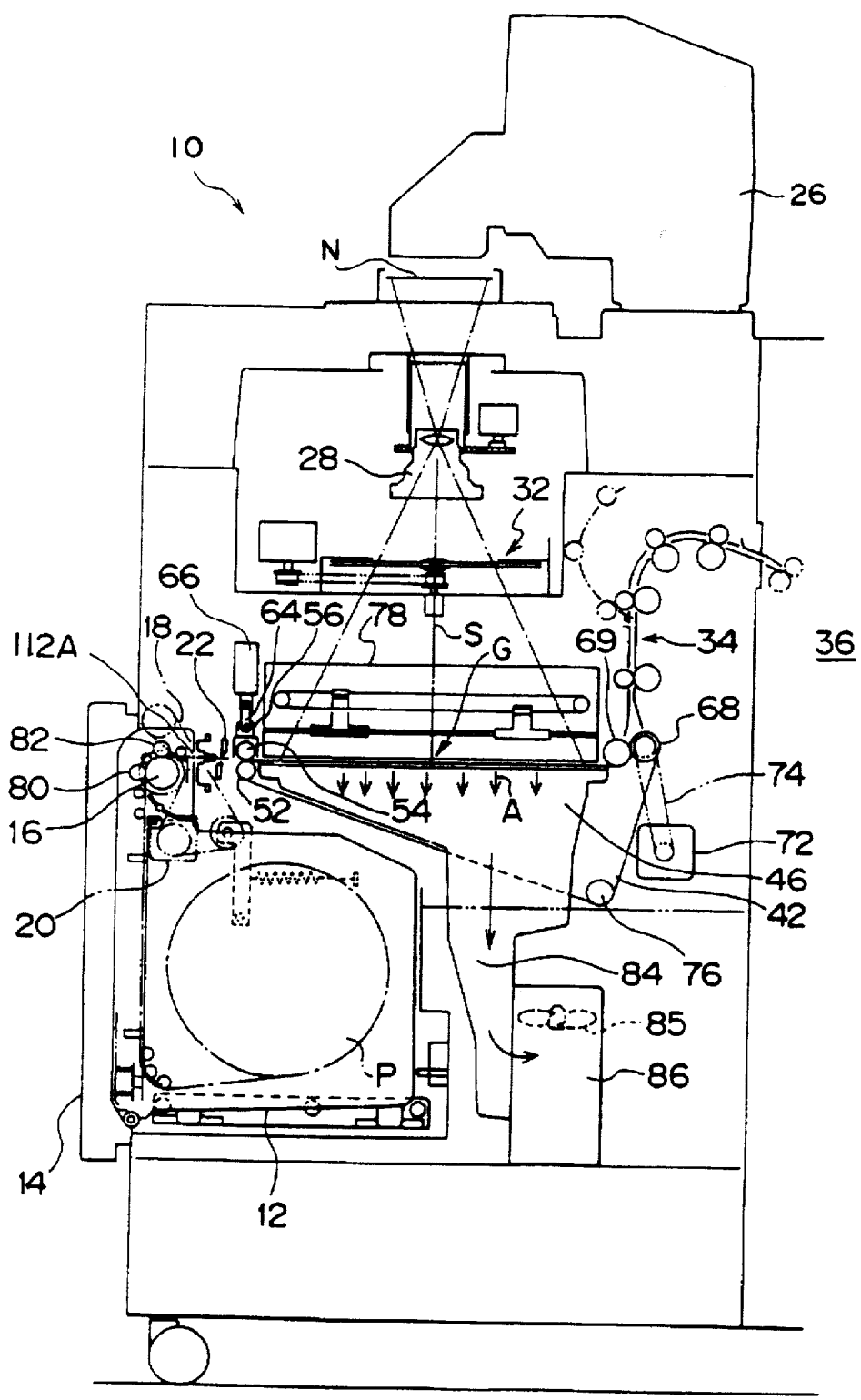
FIG. 1 is a schematic structural view of a photographic printing device in which an embodiment of a paper magazine relating to the present invention is loaded.

A photographic printing device 10 in which the paper magazine of the embodiment of the present invention is loaded is illustrated in FIG. 1.

The photographic printing device 10, which forms a printer section of a photographic processing device, is structured such that a paper magazine 12, in which a photographic printing paper P is accommodated, can be loaded therein. When an opening/closing door 14 is closed after the paper magazine 12 is inserted into the photographic printing device 10, the loading of the paper magazine 12 is completed.

Figure 2:
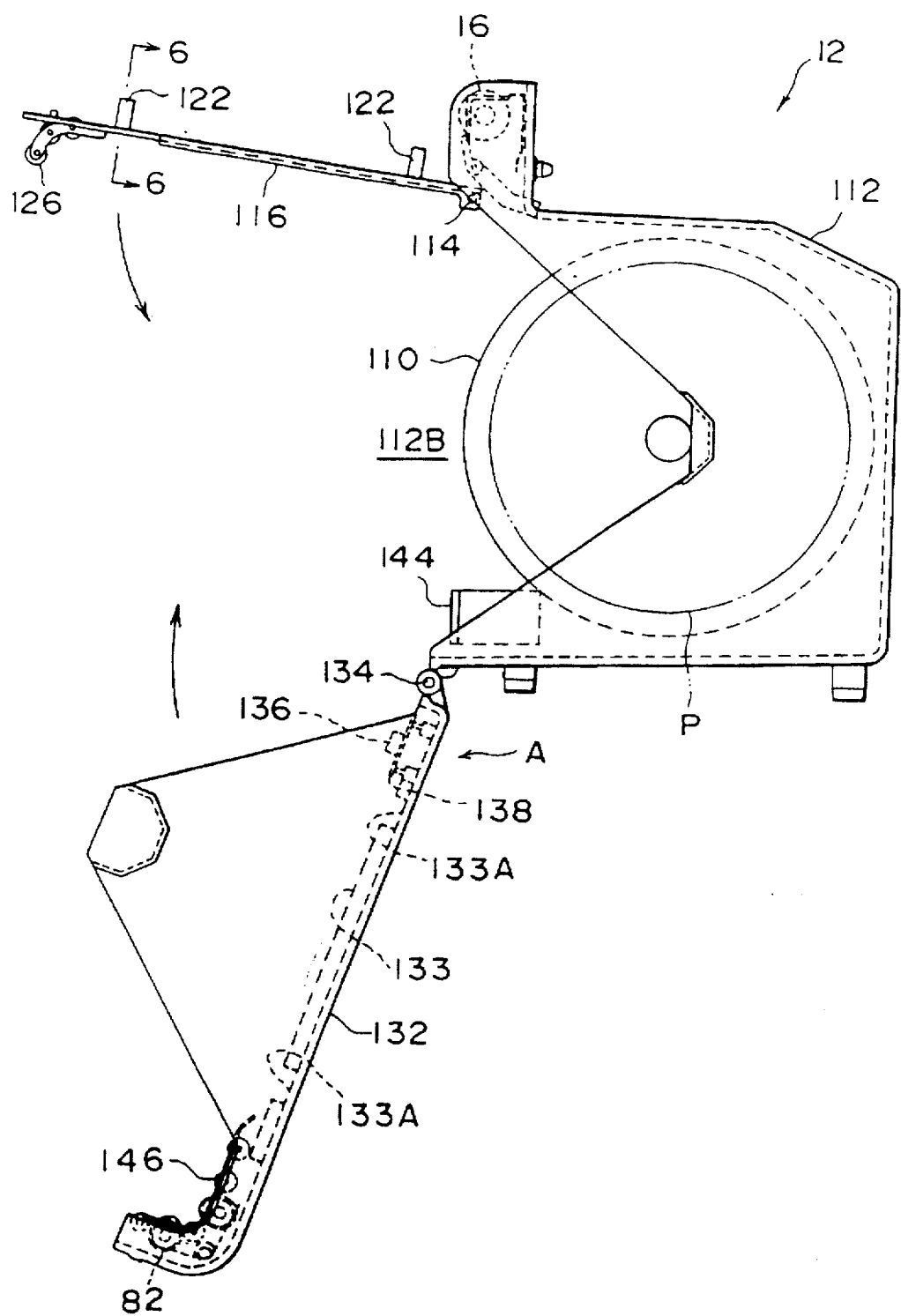
FIG. 2 is a side view of the embodiment of the paper magazine relating to the present invention, illustrating an open state of the paper magazine.
Figure 3:
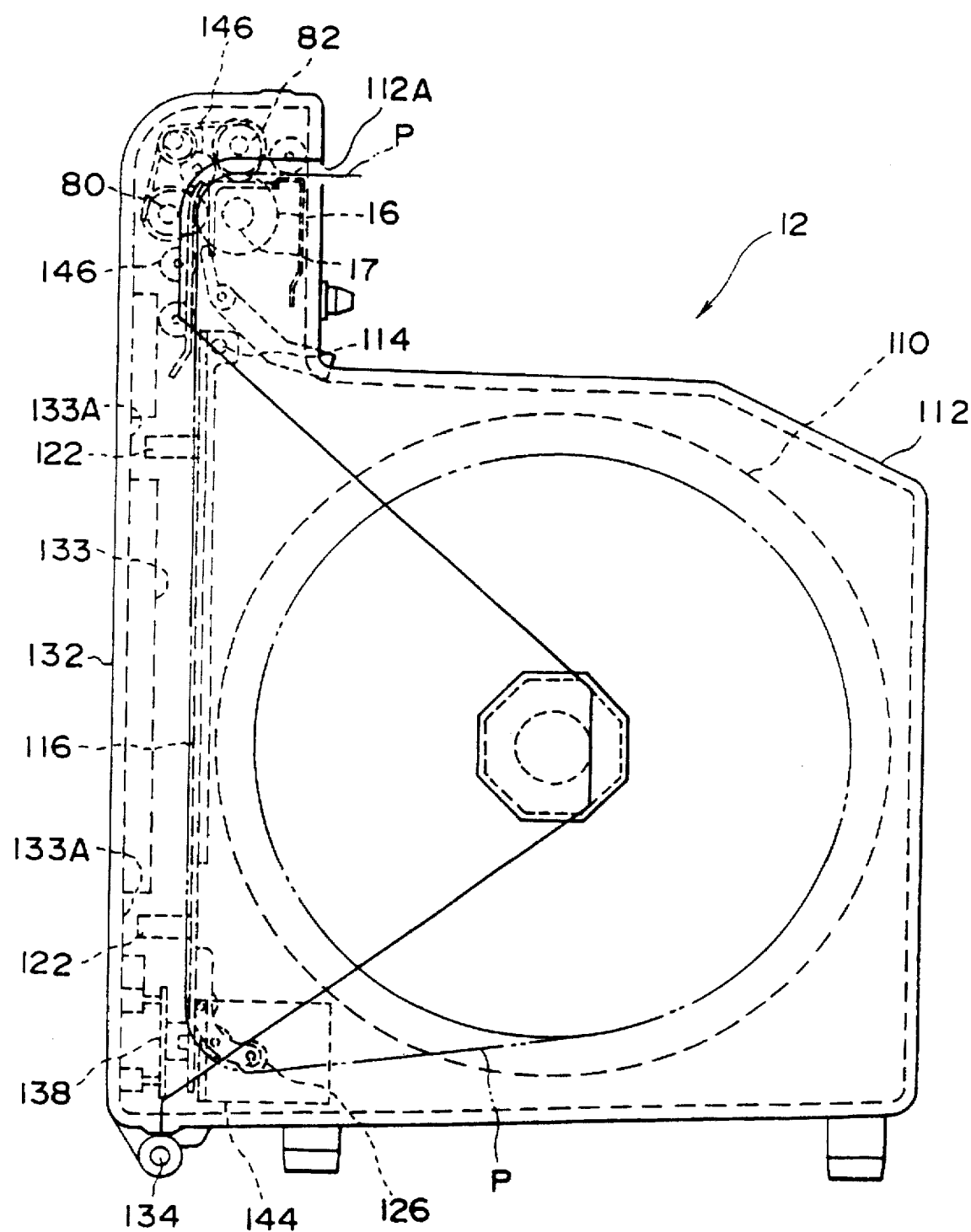
FIG. 3 is a side view of the embodiment of the paper magazine relating to the present invention, illustrating a closed state of the paper magazine.

As illustrated in FIGS. 2 and 3, a main portion of the paper magazine 12 is structured by a box-shaped magazine main body 112 in which a reel 110, around which the photographic printing paper P is wound, can be accommodated from an open portion 112B. A plate-shaped guide plate 116, which is a guide member which guides the photographic printing paper P, is attached to one end portion of the magazine main body 112 via a hinge 114. The guide plate 114 can be pivoted around the hinge 114 between the open state illustrated in FIG. 2 and the closed state illustrated in FIG. 3.

Figure 4:
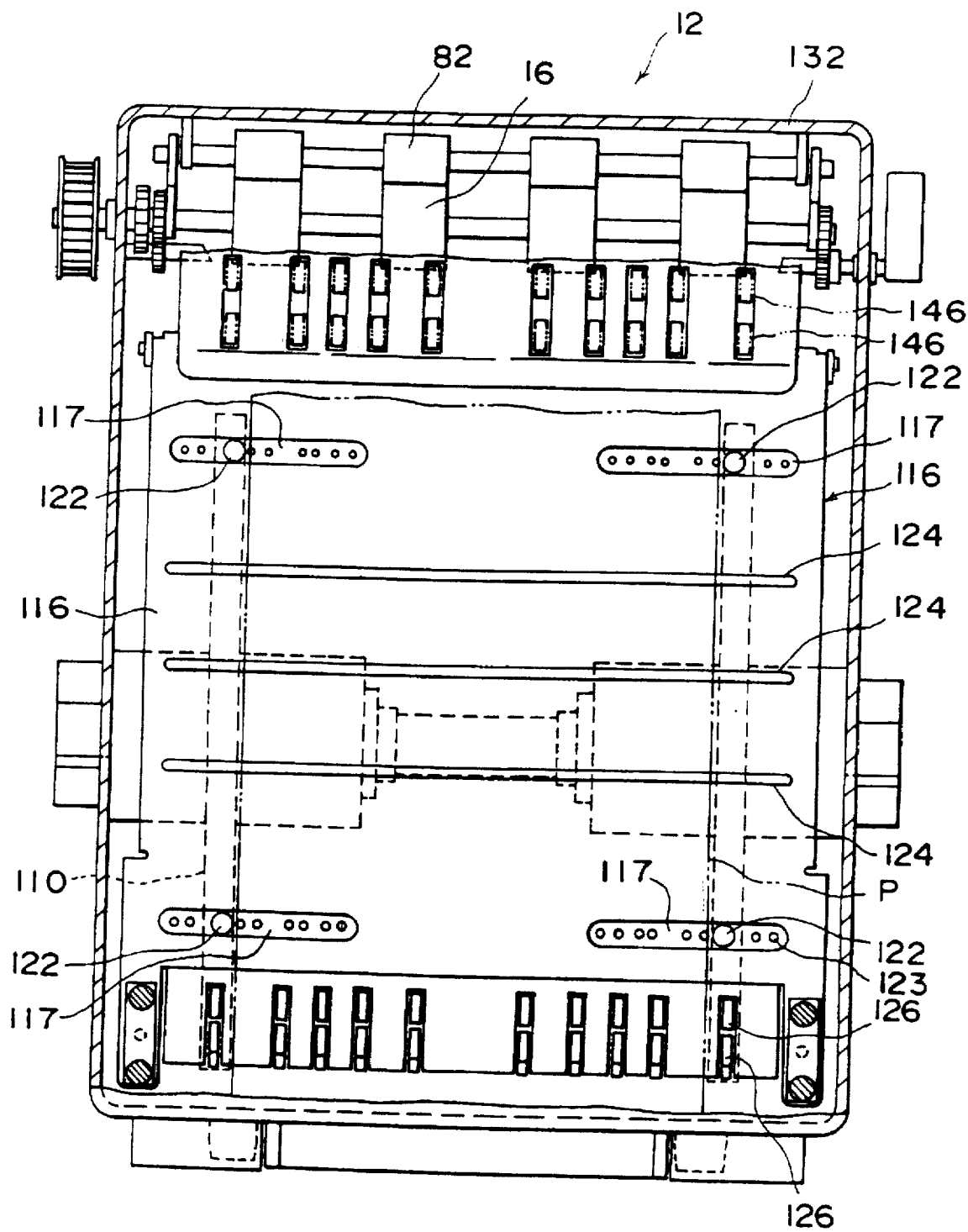
FIG. 4 is a partially broken front view of the embodiment of the paper magazine relating to the present invention, illustrating the closed state of the paper magazine.
Figure 5:
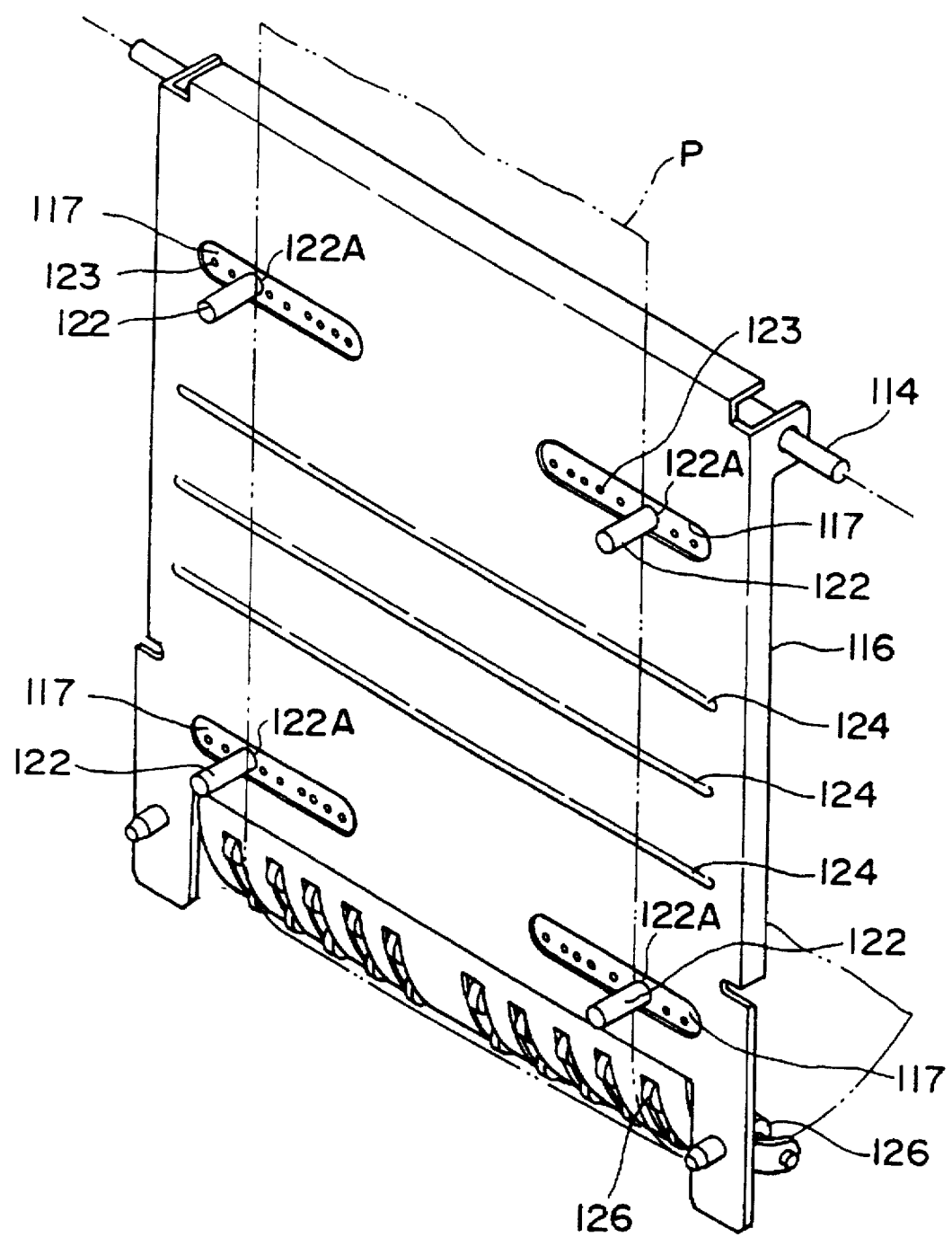
FIG. 5 is a perspective view illustrating a guide plate of the embodiment of the paper magazine relating to the present invention.
Figure 6:
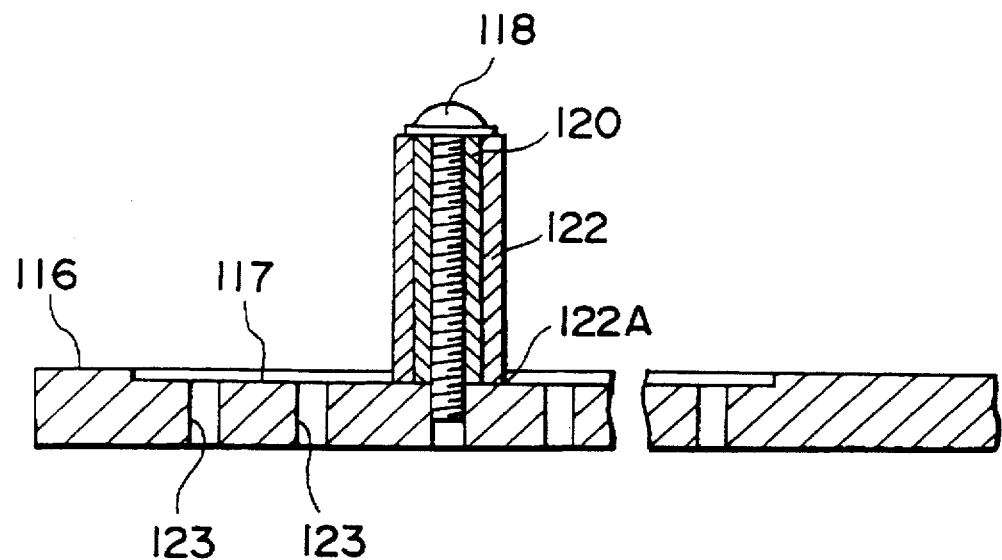
FIG. 6 is a view taken along arrow 6—6 of FIG. 2.

As illustrated in FIGS. 5 and 6, a pair of collars 120 is screwed to the distal end side of the guide plate 116 by bolts 118. A cylindrical tube-shaped guide roller 122 is fit with each of the collars 120 so as to be freely rotatable. Further, in the same way as the above-described guide rollers 122, a pair of the guide rollers 122 are fit so as to be freely rotatable at the proximal end side of the guide plate 116 as well. Accordingly, as illustrated in FIGS. 4 and 5, transverse direction end portions of the photographic printing paper P are guided by the four guide rollers 122, so that the photographic printing paper P is conveyed correctly along the conveying direction, which is the direction of delivering the photographic printing paper P.

Attachment surfaces 117 are formed at portions at which the guide rollers 122 are disposed. The attachment surfaces 117 are formed so as to be long along the transverse direction of the photographic printing paper P, and so as to be a step lower than the surrounding regions. The attachment surfaces 117 are formed so that the photographic printing paper P does not abut a lower end corner portion 122A of the guide roller 122 and consequently is not damaged. A plurality of screw holes 123 are formed along the transverse direction of the photographic printing paper P in the attachment surfaces 117, which are formed so as to be a step lower than the surrounding regions, so that the respective positions of the guide rollers 122 can be changed to correspond to the width of the photographic printing paper P. Further, three protruding portions 124, which extend in a direction orthogonal to the conveying direction are provided on the top surface of the guide plate 116. Accordingly, when the photographic printing paper P is being conveyed, the photographic printing paper P is supported at the top edges of the protruding portions 124, and friction between the guide plate 116 and the photographic printing paper P is reduced.

Second rollers 126 which guide the photographic printing paper P are disposed at the distal end portion of the guide plate 116 so as to be freely rotatable so that friction between the guide plate 116 and the photographic printing paper P is reduced.

A cover 132 is attached to the other end portion of the magazine main body 112 via a hinge 134. The cover 132 is pivoted around the hinge 134 between the open state illustrated in FIG. 2 and the closed state illustrated in FIG. 3 so that the open portion 112B can be closed off.

Figure 7:
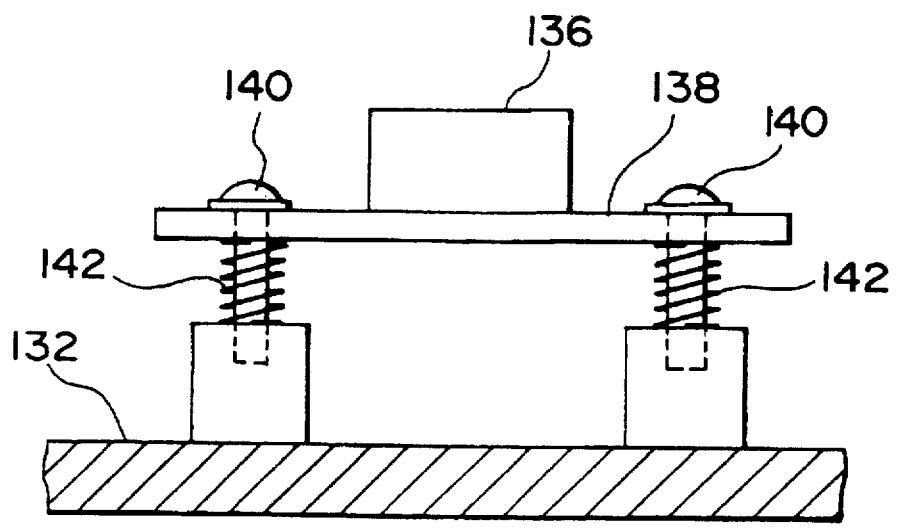
FIG. 7 is an enlarged broken view of portion A of FIG. 2.

As illustrated in FIG. 7, a pusher plate 138 is supported at the proximal end side of the cover 132 by a pair of screws 140 so as to be slidable. The pusher plate 138 is a positioning member, and an abutment member 136 is adhered thereto. Coil springs 142, which are elastic bodies wound around the screws 140, push the pusher plate 138 toward the guide plate 116. A supporting plate 144 is fixed to a portion of the magazine main body 112 which opposes the pusher plate 138.

Accordingly, in the closed state illustrated in FIG. 3, because the abutment member 136 contacts the guide plate 116, the guide plate 116 is pushed toward the supporting plate 144 of the magazine main body 112, and the guide plate 116 is fixed within the paper magazine 12.

A guide surface 133 is provided at the cover 132. The guide surface 133 forms an inner wall of the paper magazine 12 and is positioned so as to oppose the guide plate 116 with the photographic printing paper P disposed between the guide plate 116 and the guide surface 133. The guide surface 133 guides the photographic printing paper P. Recesses 133A are formed in portions of the guide surface 133 which oppose the guide rollers 122 such that the guide surface 133 does not contact the guide rollers 122.

A third roller, which is a driving roller 16 around which a vicinity of the leading end portion of the photographic printing paper P is trained, is supported so as to be freely rotatable at the upper left portion of the magazine main body 112 as seen in FIGS. 1 and 3. Via a driving belt 18 provided within the photographic printing device 10, the driving roller 16 receives the driving force of a motor 20 disposed within the photographic printing device 10, and is rotated thereby. Further, rollers 146, which guide the photographic printing paper P, as well as a pair of nip rollers 80, 82 are disposed at positions of the cover 132 which oppose the driving roller 16. As a result, the driving roller 16 nips the photographic printing paper P between the nip roller 80, 82 and delivers the leading end of the photographic printing paper P into the photographic printing device 10.

Accordingly, in the closed state illustrated in FIG. 3, the photographic printing paper P is interposed between the guide surface 133 of the cover 132 and the guide plate 116, and is guided toward the driving roller 16, the nip rollers 80, 82, and a magazine opening 112A. The driving roller 16 and the nip rollers 80, 82 nip and convey the photographic printing paper P.

A cutter 22, which is formed from a pair of upper and lower blades, is disposed within the photographic printing device 10. The cutter 22 cuts the photographic printing paper P which has been discharged from the paper magazine 12.

As shown in FIG. 1, a support stand 46, whose upper surface is formed along the horizontal direction (in left and right directions in FIG. 1), is disposed downstream of the cutter 22 in the conveying direction of the photographic printing paper P, i.e., at the right side of the cutter 22 in FIG. 1. A training roller 52, around which an endless belt 42 is trained, is disposed horizontally (in a direction orthogonal to the paper surface of FIG. 1) between the supporting stand 46 and the cutter 22. A rising/falling roller 54 is disposed above the training roller 52 and parallel thereto, such that the endless belt 42 is nipped between the training roller 52 and the rising/falling roller 54.

Axial direction end portions of the rising/falling roller 54 are axially supported by arms 56. The arms 56 are connected to a self-holding-type solenoid 66 via links 64. Accordingly, when an energizing pulse voltage is input to the solenoid 66 such that the solenoid 66 is operated, the arms 56 rise and the rising/falling roller 54 moves apart from the endless belt 42.

When a reverse operation pulse voltage is inputted to the solenoid 66, the rising/falling roller 54 contacts the endless belt 42 on the training roller 52 due to the urging force of unillustrated springs so that the photographic printing paper P can be nipped between the rising/falling roller 54 and the endless belt 42.

A guide roller 68, around which the endless belt 42 is trained, is located downstream of the supporting stand 46 in the conveying direction of the photographic printing paper P. A guide roller 69 is disposed at a position adjacent to the guide roller 68 such that the bottom surface of the guide roller 69 is at substantially the same height as the upper surface of the training roller 52. The guide roller 69 is pushed toward the outer periphery of the endless belt 42.

Namely, as illustrated in FIG. 1, the endless belt 42 is trained around approximately ¼ of the outer circumference of the guide roller 69, and thereafter, is trained around about ⅔ of the outer circumference of the guide roller 68, such that this portion of the endless belt 42 is S-shaped. Further, the endless belt 42 is trained around a tension roller 76 beneath the guide roller 68 such that a triangular locus of movement is formed.

The guide roller 68 receives the driving force of a motor 72 via a timing belt 74 so as to be driven and rotated, and the endless belt 42 is driven and rotated in a clockwise direction in FIG. 1.

Accordingly, after the photographic printing paper P which has been delivered out from the paper magazine 12 is cut to a desired length at the cutter 22, the photographic printing paper P is set on the endless belt 42 and is conveyed to an exposure/printing position G which is a position on an optical axis S of the printing light. The printing light from a light source 28 reaches the photographic printing paper P via an optical means 28 and a shutter 32, so that an image recorded on a negative film N is printed onto the photographic printing paper P. The portion at which the image is printed is a printed image.

The photographic printing paper P, for which printing of an image has been completed, is nipped between the guide roller 88 and the guide roller 89. The conveying direction thereof is changed from horizontal To vertical, and the photographic printing paper P is conveyed in a vertical direction. Thereafter, the photographic printing paper P is sent via a conveying path 34 to a developing device 36 where the printed image is developed.

A plurality of small holes (unillustrated) are formed in the entire endless belt 42. Further, a plurality of small holes (unillustrated) are formed in the upper surface of the supporting stand 48 on which a portion of the endless belt 42 rests. At this portion of the endless belt 42, the photographic printing paper P should be disposed in a horizontal state at the image printing position G.

The interior portion of the supporting stand 46 is hollow. A pair of communicating ducts 84 (only one is illustrated in the drawings), which are formed so as to correspond to the transverse direction ends of the endless belt 42, are connected to the supporting stand 46. The communicating ducts 84 bypass the return portion of the endless belt 42 disposed under the supporting stand 46 and extend below the endless belt 42. The communicating ducts 84 extend further downward and are connected to a fan box 86 provided with a suction fan 85.

In this way, the air within the supporting stand 46 is drawn out from within the loop of the endless belt 42 to the transverse direction ends thereof via the communicating ducts 84, is sucked by the suction fan 85, and is blown out to the exterior. Therefore, the interior of the supporting stand 46 is at negative pressure. The negative pressure is transmitted to the photographic printing paper P on the endless belt 42 via the hole portions in the supporting stand 46 and the small holes in the endless belt 42, so that the photographic printing paper P is sucked to the endless belt 42 as illustrated by arrows A.

As a result, because the photographic printing paper P is not merely set on the endless belt 42 but is sucked thereto, the photographic printing paper P is reliably conveyed by the endless belt 42.

As illustrated in FIG. 1, an easel device 78 is provided above the portion of the endless belt 42 which moves on the supporting stand 46. When a bordered image is printed on the photographic printing paper P, the periphery of the photographic printing paper P is covered by the easel device 78.

Operation of the present embodiment will be described hereinafter.

In the open state illustrated in FIG. 2, an operator loads the reel 110, around which the photographic printing paper P is wound, from the open portion 112B of the magazine main body 112 into the paper magazine 12. Next, the guide plate 116 and the cover 132 are pivoted such that the paper magazine 12 is set in the closed state illustrated in FIG. 3. At this time, as illustrated in FIGS. 4 and 5, the leading end of the photographic printing paper P is delivered to the magazine opening portion 112A while the photographic printing paper P passes along the surface of the guide plate 116 between the guide rollers 122.

Thereafter, when the paper magazine 12 is loaded in the photographic printing device 10, the motor 20 is rotated, and the rotation is transmitted to the driving roller 16 via the driving belt 18. As a result, the driving roller 16 is rotated in the clockwise direction, and the photographic printing paper P is delivered out from the magazine 12 by a predetermined amount.

Accordingly, when the photographic printing paper P is delivered out to the exterior of the paper magazine 12, not only is the reverse surface of the photographic printing paper P is guided by the guide plate 116 and the photosensitive surface guided by the guide surface 133 of the cover 132, but also, the transverse direction end portions of the photographic printing paper P are guided by the guide rollers 122. As a result, when the photographic printing paper P is delivered out to the exterior of the paper magazine 12, the position of the photographic printing paper P within the paper magazine 12 is reliably regulated.

At this time, because the transverse direction end portions of the photographic printing paper P are guided by the freely rotatable guide rollers 122, the load applied to the photographic printing paper P while it is being conveyed is reduced so that the photographic printing paper P is not damaged. Further, in the state in which the open portion 112B is closed by the cover 132, the cover 132 is positioned so as to oppose the guide plate 116. Therefore, when the photographic printing paper P is loaded into the paper magazine 12 from the open portion 112B of the magazine main body 112, the cover 132 does not hinder the loading operation, and the loadability of the photographic printing paper P is improved. Moreover, in the closed state, the photographic printing paper P is interposed between the cover 132 and the guide plate 116, so that the photographic printing paper P can be prevented from separating from the guide rollers 122.

Further, the guide rollers 122 are attached so as to be freely rotatable to the attachment surfaces 117 which are formed so as to be a step lower than the flat surface formed by the guide plate 116. Therefore, the transverse direction end portions of the photographic printing paper P guided by the guide rollers 122 do not contact the corner portions 122A of the guide rollers 122. As a result, the transverse direction end portions of the photographic printing paper P are not damaged due to contact with the corner portions 122A. Moreover, in the closed state illustrated in FIG. 3, the guide plate 116 is reliably fixed by the abutment member 136 and the pusher plate 138 which contact and position the guide plate 116.

The photographic printing paper P which has been delivered out to the photographic printing device 10 is cut to a predetermined length by the cutter 22. The cut photographic printing paper P moves on the supporting stand 46 due to the endless belt 42. An image is printed on the photographic printing paper P which is then sent to the developing device 36 via the conveying path 34, and the printed image is developed. Accordingly, when the image is printed, the photographic printing paper P is not inclined and does not deviate from the conveying path, so that the image is printed correctly.

In the present embodiment, the reverse surface of the photographic printing paper P is guided by the guide plate 116, and the photosensitive surface is guided by the guide surface 133 of the cover 132. However, an opposite structure may be used, i.e., the photosensitive surface of the photographic printing paper P may be guided by the guide plate 116, and the reverse surface may be guided by the guide surface 133. Further, although the guide plate 116 pivots around the hinge 114 in the present embodiment, a fixed guide may be used provided that it does not deteriorate the loadability of the photographic printing paper P.

In the present embodiment, although the photosensitive material is photographic printing paper, a photosensitive material other than photographic printing paper, such as film or the like, may be used.

As described above, the paper magazine of the present invention provides a superior effect in that the loadability of the photographic printing paper is improved, load applied to the photographic printing paper during the conveying thereof is reduced, and the position of the photographic printing paper within the paper magazine can be regulated reliably.

What is claimed is:

1. A paper magazine comprising:

a magazine main body in which an elongated photosensitive material is accessible from an open portion of said magazine main body;

a guide member attached to said magazine main body and guiding the photosensitive material along a direction of delivery to a magazine opening through which the photosensitive material is delivered out to an exterior of said paper magazine;

at least one first guide roller attached to said guide member so as to be freely rotatable, said first guide roller contacting an edge of photosensitive material along the direction of delivery of the photosensitive material and guiding the photosensitive material when the photosensitive material is delivered out to the exterior of said paper magazine; and a cover supported at said magazine main body so as to be able to open and close the open portion of said magazine main body, and when said cover is closed, said cover being positioned so as to oppose said guide member with the photosensitive material being disposed between said guide member and said cover.

2. A paper magazine according to claim 1, wherein said magazine main body is formed in a box-shape having one open side.

3. A paper magazine according to claim 1, wherein a plurality of screw holes for attaching at least one of said first guide rollers are formed in said guide member along a transverse direction of the photosensitive material so that a position of at least one of said first guide rollers can be changed to coincide with a width of the photosensitive material.

4. A paper magazine according to claim 1, wherein said guide member and said cover respectively have freely rotatable second and third rollers, said second and third rollers being disposed along a direction of delivery of the photosensitive material such that said plurality of first guide rollers are interposed between said second and third rollers.

5. A paper magazine according to claim 1, wherein protrusions extending in a transverse direction of the photosensitive material are provided at portions of said guide member which oppose the photosensitive material.

6. A paper magazine according to claim 1, wherein said dust guide roller is formed in a cylindrical tube shape so as to fit in a freely rotatable manner with a collar which is screwed to said guide member.

7. A paper magazine according to claim 1, wherein said cover is supported at said magazine main body via a hinge so as to be rotatable, and said cover can open and close the open portion of said magazine main body.

8. A paper magazine according to claim 1, wherein at least one of said guide rollers is adjustable in a direction transverse of the photosensitive material.

* * * * *